J. H. ADAMS.
BACK STOP FOR VEHICLES.
APPLICATION FILED JUNE 4, 1912.
1,067,707.
Patented July 15, 1913.
2 SHEETS—SHEET 2.
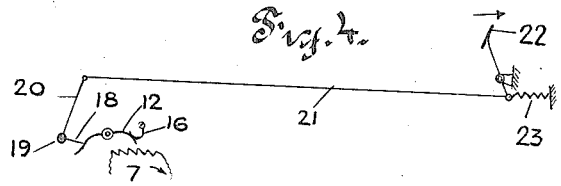
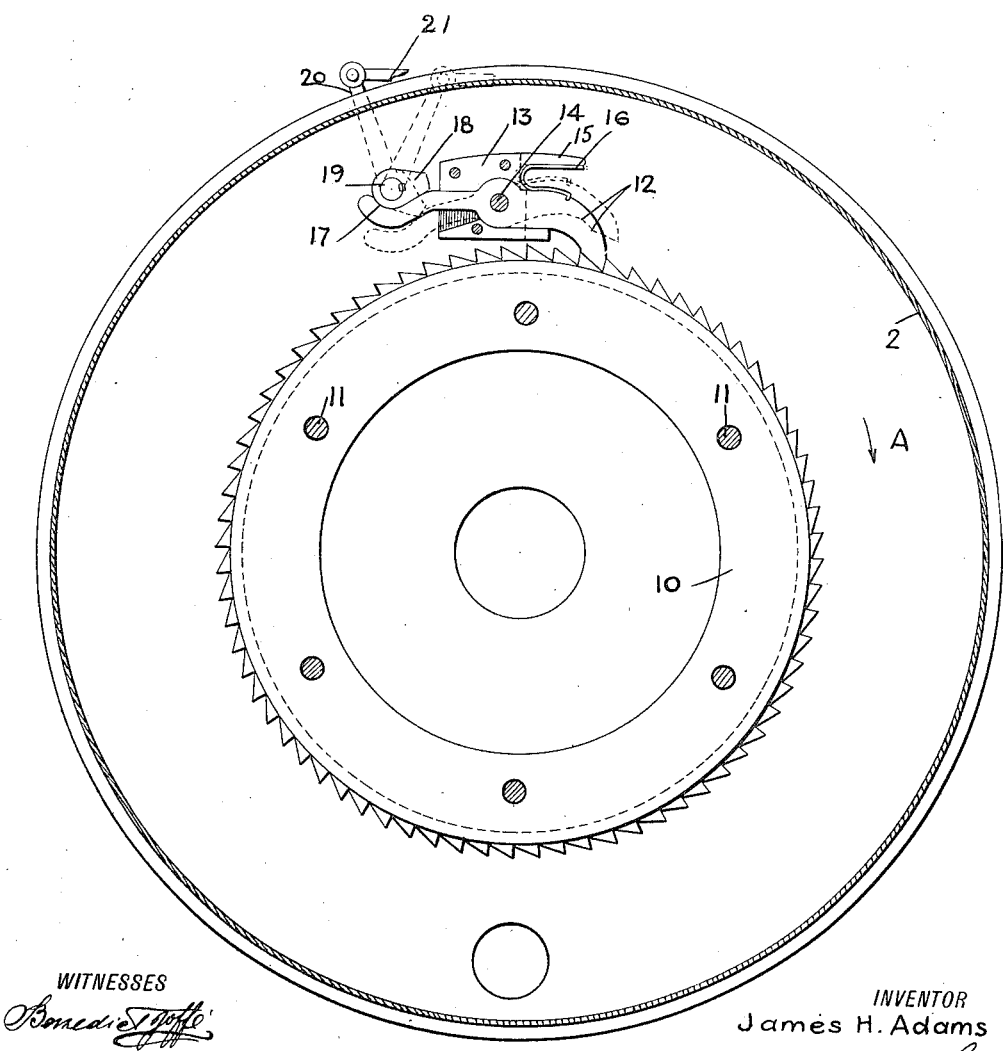
WITNESSES
INVENTOR
James H. Adams
BY
ATTORNEYS

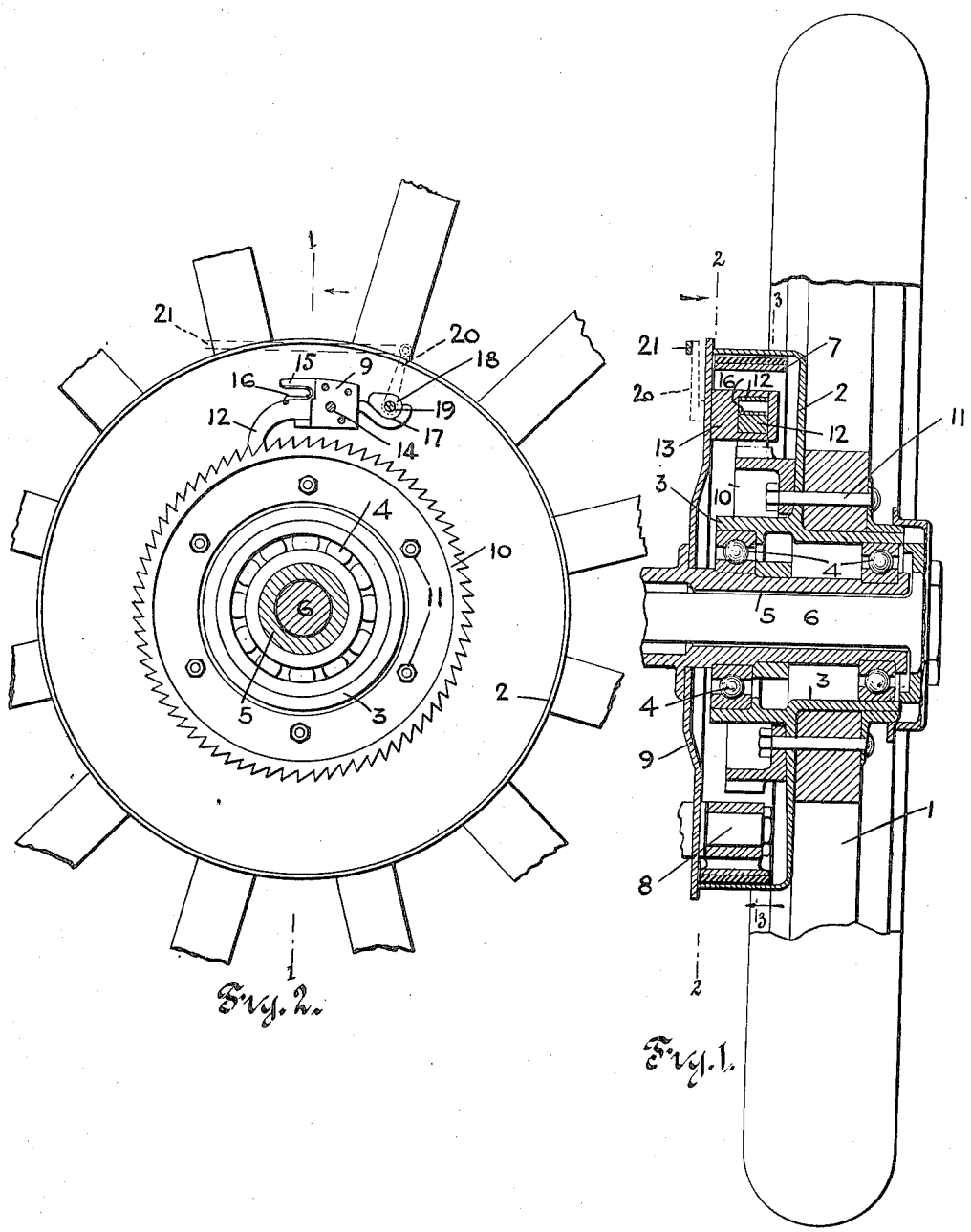

UNITED STATES PATENT OFFICE.

JAMES HARRISON ADAMS, OF TAFT, CALIFORNIA, ASSIGNOR OF ONE-HALF TO WILLIAM O. CLAY, OF TAFT, CALIFORNIA.

BACK-STOP FOR VEHICLES.

1,067,707. Specification of Letters Patent. Patented July 15, 1913.

Application filed June 4, 1912. Serial No. 701,541.

*To all whom it may concern:*

Be it known that I, JAMES H. ADAMS, a citizen of the United States, and a resident of Taft, in the county of Kern and State of California, have invented a new and Improved Back-Stop for Vehicles, of which the following is a full, clear, and exact description.

This invention relates to back stops for vehicles, and more particularly to a device mounted on a wheel of a vehicle comprising a rotating member, a pivoted member and means associated with same to control the engagement of the two members whereby the backing of a vehicle is prevented.

An object of the invention is to provide an inexpensive, simple and reliable back stop for vehicles which can be easily attached to the wheel of a vehicle and provided with a controlling lever or pedal for the operation of the device by the driver when desired.

A further object of the invention is to provide a back stop which is normally in a non-operative position and will not modify or otherwise affect the operation of the vehicle.

The invention consists in the construction and combination of parts, to be more fully described hereinafter and particularly set forth in the claims.

Reference is to be had to the accompanying drawings forming a part of this specification, in which similar characters of reference indicate corresponding parts in all the views, and in which—

Figure 1 is a side elevation of a motor driven wheel for a vehicle, partly in section, embodying my invention; Fig. 2 is a sectional view on the line 2—2 of Fig. 1, in the direction indicated by the arrow, with the brake ribbon removed; Fig. 3 is also a sectional view on the line 3—3 of Fig. 1, with the bearing parts and brake removed; and Fig. 4 is a diagrammatic view of the device in connection with the operating pedal.

Before proceeding to a more detailed description of my invention it must be understood that my device may be attached on any rotating member of a vehicle, and the general relation of parts forming the device may be differently arranged in accordance with special conditions, without departing from the underlying spirit of the invention.

Referring more particularly to the drawings, 1 is a driven wheel of a motor vehicle and 2 is a brake drum provided with a bearing case 3 and ball bearings 4, 4, the whole journaling on the shell 5 of the driving shaft 6. The brake drum 2 is also internally provided with a brake ribbon 7 pivotally attached to a bolt 8 and provided with means to operate the brake, not shown in the drawings. The bolt 8 is fixed to a stationary flange 9, which in turn is attached to the shell 5 and serves as a cover for the brake drum 2. Into the drum 2, fitting loosely over the bearing case 3, a ratchet wheel 10 is rigidly attached to the said drum and the wheel by a plurality of bolts 11. Engaging one end of the ratchet wheel 10 is a pawl 12 journaling in a bearing 13 and pivoted in same on a pin 14. The bearing 13 is rigidly attached to the stationary flange 9 and is provided with an extending lip 15 against which a flat spring 16, fixed in the pawl 12, is bearing. The other end of the pawl is provided with a curved cam surface 17 engaging a cam 18 fixed on a shaft 19, journaling in the flange 9 and connected to a crank arm 20, which in turn is connected by a rod 21 to a pedal 22 and spring 23. The spring normally holds the pawl 12 disengaged from the ratchet wheel 10.

Under normal conditions the position of the device is indicated in dotted lines in Fig. 3, and it is easily understood that the backward motion of the vehicle is obtained without interference with the device. To operate the device pressure is applied to the pedal 22, forcing the rack 21 (see Fig. 4) to the left, as a consequence forcing the cam 18 through the crank arm 20 and shaft 19 upward, thus permitting the flat spring 16 to turn the pawl 12 on the pin 14 downward into engagement with the ratchet wheel 10, as shown in Figs. 2 and 3. It is easily seen that the pawl allows only forward motion, as indicated by the arrow A in Fig. 3, and no backing of the vehicle is possible. The importance of this is easily seen when a dangerous hill is ascended by a vehicle supplied with a device as described; no matter what happens to the motive power during the ascent of the hill the vehicle will only stop, being prevented from backing, and cannot return to the foot of the hill at a speed dangerous to the occupants of the vehicle, and other vehicles ascending or at the foot of the same hill.

Having thus described my invention, what I claim as new and desire to secure by Letters Patent is:—

1. A device of the class described, comprising a ratchet wheel adapted to be secured to a rotating member of a vehicle, a bearing adjacent the periphery of said ratchet wheel, a member pivotally mounted in said bearing and having an arm at one end adapted to engage the ratchet wheel, a spring member for forcing said arm into engagement with the teeth of said ratchet wheel, the said pivotally mounted member being provided at the other end with an upwardly curved arm forming a cam surface, a cam engaging the said upwardly curved cam surface, and means for actuating said cam to control the engagement of said pivotally mounted member with the said ratchet wheel.

2. A device of the character described, comprising a drum, a ratchet wheel within the drum, the drum and ratchet wheel being adapted to be secured to a vehicle wheel, a pawl provided at one end with an arm having a curved cam surface, the other end of said pawl being adapted to engage said ratchet wheel, a fixed bearing in which said pawl is pivoted, the said bearing having an extended lip, a flat spring between the said pawl and the said lip and fixed at one end to the pawl, the other end of said spring bearing on said lip to force said pawl into engagement with said ratchet wheel, a cam engaging the curved surface of the arm of said pawl, and means connected with said cam for normally holding the same in position to disengage the pawl from the ratchet wheel.

3. A device of the class described, comprising a ratchet wheel adapted to be secured to a vehicle wheel, a fixed bearing adjacent the periphery of the ratchet wheel, a pawl pivotally mounted in said bearing and having one end curved downwardly and adapted to engage the ratchet wheel, a spring for forcing said end of the pawl into engagement with the ratchet wheel, the other end of said pawl being curved upwardly and forming a cam surface, a cam shaft mounted to turn and extending above the said upwardly curved cam surface of the pawl, a cam carried by said shaft and engaging said cam surface of the pawl, a spring-controlled device connected with said cam shaft and normally holding said cam in position to disengage the pawl from the ratchet wheel, and means for operating said device to move the cam into position to permit the pawl under the action of its spring to engage said ratchet wheel.

4. The combination with a vehicle wheel, of a drum provided with a bearing case journaled on the shell of the driving shaft, a stationary flange attached to the shell of the driving shaft and forming a cover for the drum, a ratchet wheel within the drum and fitting loosely over the bearing case, means for rigidly securing the ratchet wheel to the drum and the vehicle wheel, a bearing within the drum and rigidly secured to the stationary flange, a pawl pivoted in said bearing, one end of said pawl being adapted for engagement with the ratchet wheel, a spring tending to hold the pawl in engagement with the ratchet wheel, a cam engaging the other end of said pawl, and means for actuating said cam to control the engagement of said pawl with the ratchet wheel.

In testimony whereof I have signed my name to this specification in the presence of two subscribing witnesses.

JAMES HARRISON ADAMS.

Witnesses:
J. C. McCrony,
E. D. Kideiler.